United States Patent [19]

Yamamoto

[11] Patent Number: 4,506,342
[45] Date of Patent: Mar. 19, 1985

[54] DOCUMENT INFORMATION FILING SYSTEM

[75] Inventor: Kazuhiko Yamamoto, Yokosuka, Japan

[73] Assignee: Tokyo Shibaura Denki Kabushiki Kaisha, Japan

[21] Appl. No.: 317,423

[22] Filed: Nov. 2, 1981

[30] Foreign Application Priority Data

Nov. 5, 1980 [JP] Japan .................. 55-155473

[51] Int. Cl.$^3$ ............................................ G06F 15/40
[52] U.S. Cl. ................... 364/900; 355/14 C; 358/261; 358/903; 360/72.2
[58] Field of Search ............... 358/335, 260, 261, 256, 358/257, 903; 364/401, 403, 419, 514, 518, 521, 525; 355/8, 14 C; 340/347 R; 360/33.1, 72.2

[56] References Cited

U.S. PATENT DOCUMENTS

| 4,013,876 | 3/1977 | Anstin | 364/419 |
|---|---|---|---|
| 4,139,869 | 2/1979 | Holt | 360/72.2 X |
| 4,168,513 | 9/1979 | Hains et al. | 358/261 |
| 4,193,096 | 3/1980 | Stoffel | 358/260 |
| 4,205,780 | 6/1980 | Burns et al. | 364/521 |
| 4,206,483 | 6/1980 | Nakamura | 360/33.1 |
| 4,264,808 | 4/1981 | Owens et al. | 358/256 X |
| 4,357,638 | 11/1982 | Yoshimaru et al. | 360/72.2 |
| 4,398,222 | 8/1983 | Ogawa | 358/257 X |

OTHER PUBLICATIONS

Patents Abstracts of Japan, vol. 4, No. 160, (P-35) [642], 11/8/1980, p. 105, P 35 & JP-A-55 108 076 (Tokyo Shibaura Denki K.K.) Cat. A) 19-0801980.

Primary Examiner—Errol A. Krass
Assistant Examiner—Edward R. Cosimano
Attorney, Agent, or Firm—Cushman, Darby & Cushman

[57] ABSTRACT

Title information recorded on a magnetic tape is reproduced by a longitudinal video recorder and stored in a title memory. A CPU calculates the remaining storage capacity from the address of index information in title information stored in the title memory, the rated storage capacity of a magnetic tape and the average document information quantity of unit document information. The calculated remaining storage capacity is displayed as the number of documents capable of recording on a display.

8 Claims, 7 Drawing Figures

FIG. 3
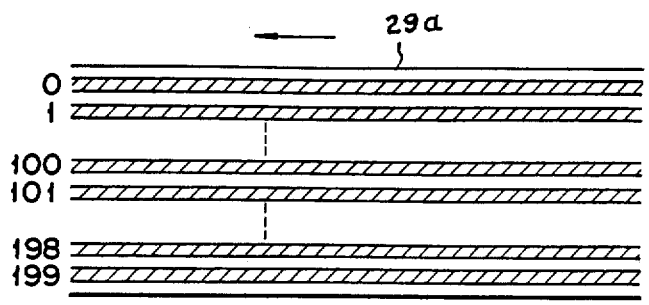
FIG. 4
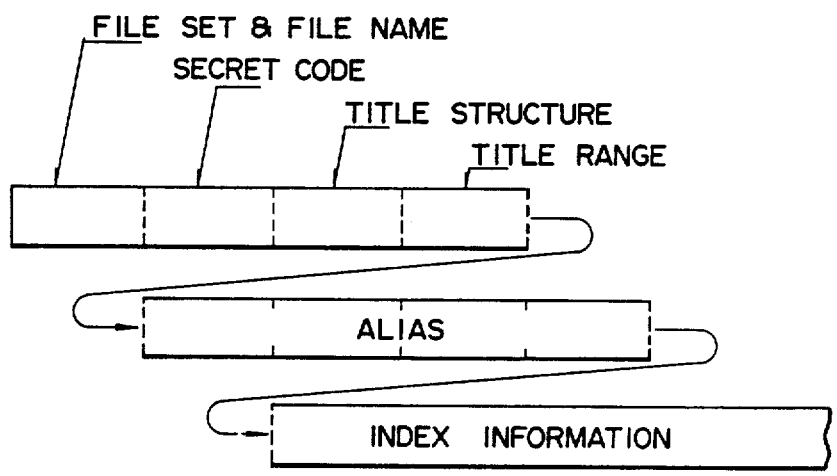
FIG. 5
| TITLE | L | T·ADR | S.ADR | S |
|---|---|---|---|---|
| 20 | 1 | 2 | 1 | 1 |
| 25 | | | | |

DOCUMENT INFORMATION FILING SYSTEM

BACKGROUND OF THE INVENTION

This invention relates to document information filing systems for storing document information in unit information after another in a recording medium and retrieving for and reading out desired document information.

Recently, document information filing systems have been developed and put to practical use. According to such document information filing system, each of a great deal of documents or the like is scanned by a scanner to produce document information which are progressively stored in a storage device. The desired document information among the various document information stored in the storage device is retrieved and read out for being reproduced into a visual state by an output device such as a cathode-ray-tube (CRT) display or a copying device.

In such document information filing system, the recording medium has a definite storage capacity (for instance about 3,000 A4 size documents in case of a magnetic tape). It is sometimes desired to know the remaining document information storage capacity of the recording medium when it is intended to record new document information.

However, in the document information filing system of the aforementioned kind, document information is recorded in the recording medium after compressing it through the modified Hofmann coding (hereinafter referred to as MH coding) for reducing the redundancy. Therefore, the quantity of image information recorded varies with the unit document information so that it is very difficult to determine the remaining document information storage capacity on the basis of the fixed storage capacity as mentioned.

SUMMARY OF THE INVENTION

An object of the invention is to provide a document information filing system, which can display the quantity of document information that can be recorded on recording medium.

According to the invention, there is provided a document information filing system, which comprises means for calculating the quantity of recorded document information recorded on a recording medium from the document information recording address recorded in a title information recording track of the recording medium and calculating the remaining storage capacity from the result of the aforementioned calculation, rated storage capacity of the recording medium and average quantity of unit document information, means for displaying the calculated remaining storage capacity obtained from the calculating means, means for producing document information through scanning of a document, information compressing means for compressing the document information from the document information producing means through the MH coding to produce compressed document information, and means for recording the compressed document information from the information compressing means on a recording medium.

BRIEF DESCRIPTION OF THE DRAWINGS

FIG. 3 is a plan view showing a magnetic tape used in the document information filing system;

FIG. 4 is a view showing a format of title information recorded in a title information recording track of the magnetic tape shown in FIG. 3;

FIG. 5 is a view showing a format of title information or index information shown in FIG. 4.

DETAILED DESCRIPTION OF THE PREFERRED EMBODIMENT

Figure 1:
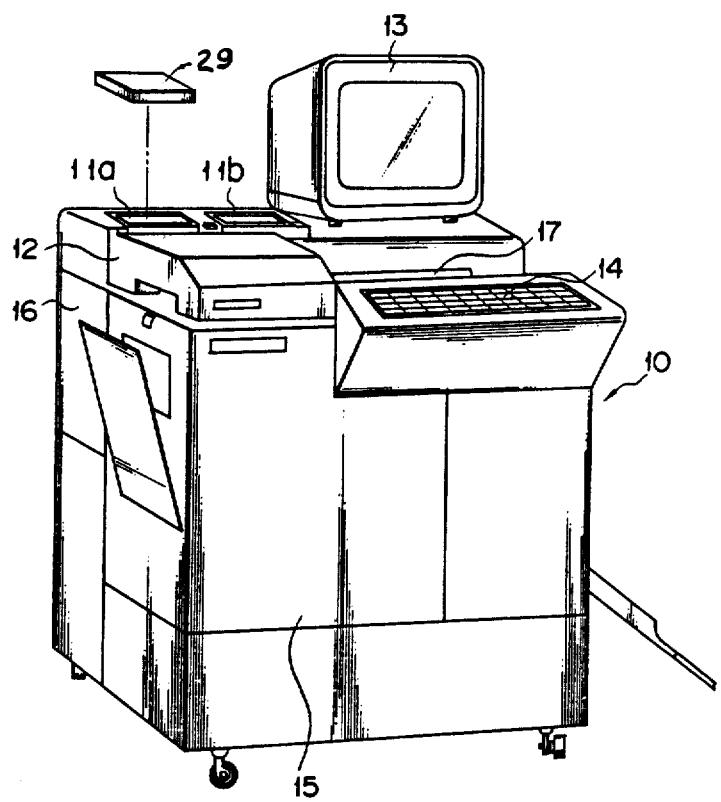
FIG. 1 is a perspective view showing an embodiment of the document information filing system according to the invention.

FIG. 1 shows a document information filing system. On the top of a console 10, a main longitudinal video recorder (LVR) 11a, a back-up VLR 11a, a scanner 12 and a cathode-ray-tube (CRT) display 13, are provided. A keyboard 14 is provided on the front side of the console 10, an electrophotographic copying device 15 is mounted inside the console 10, and a floppy disc device 16 is provided on the rear side of the console 10.

Figure 2:
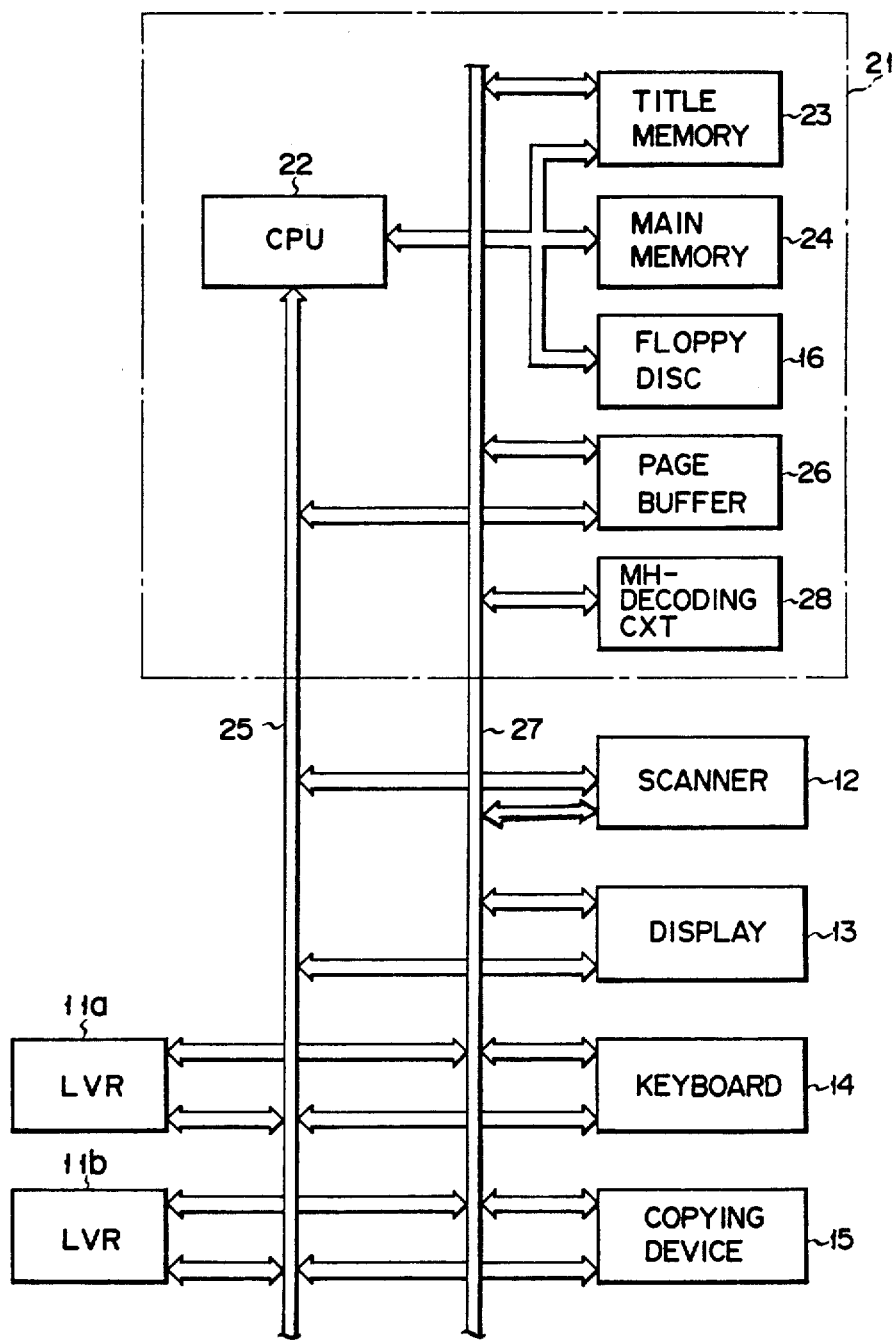
FIG. 2 is a block diagram showing the circuit construction of the document information filing system.

FIG. 2 shows a block diagram of the circuit of the document information filing system. The circuit comprises a control section 21, which includes a central processing unit (CPU) 22 as well as a title memory 23, a main memory 24 and a floppy disc device 16 connected thereto. To the CPU 22 are also connected via a data bus 25 a page buffer 26, a scanner 12, a display 13, a keyboard 14, a copying device 15 and LVRs 11a and 11b. A MH coding and decoding circuit 28 is connected via an image bus 27 to the LVRs 11a and 11b, scanner 12, display 13, keyboard 14, copying device 15, title memory 23 and page buffer 26.

FIG. 3 shows a magnetic tape 29 of a magnetic tape cassette 29a which is loaded in the LVR 11a and 11b. The magnetic tape 29a has 200 recording tracks, i.e., tracks of track No. 0 to No. 199, formed on it. On these tracks, the tracks No. 100 and No. 101 are title information recording tracks, with track of track No. 101 used as a back-up track. The remaining tracks, i.e., tracks of track No. 0 to No. 99 and No. 102 to No. 199 are used as a document information recording tracks. In the title information recording tracks No. 100 and No. 101 the same title information is recorded in a positionally deviated relation. Thus, if some of title information in the track No. 100 fails to be read out, the identical portion of title information in the back-up track (of track No. 101) is read out.

As shown in FIG. 4, the title information consists of management information containing a file set and file name code, a secret code, a title structure code, a title range code and an alias code and various index information. As shown in FIG. 5, each of the various index information contains a title code, which consists of 20 digits divided into 6 items at the most, and an address code for 5 digits. The address code consists of a 1-digit information length L (i.e., number of sectors), a 2-digit track address T.ADR (i.e., track No.), a 1-digit sector address S.ADR and a 1-digit document size S.

The individual items of the title information format shown in FIG. 4 are as follows:

File set name: a name given to a set of files of the same kind.

File name: a name given to file, i.e., a plurality of document information recorded on the magnetic tape of one magnetic tape cassette.

Secret code: a code provided for the secret purpose, consisting of a searcher's secret code permitting only an operator with a permission to retrieve or a qualified person to retrieve and a filer's secret code permitting only the filer to make processing of the file content such as storage, change and deletion.

Title structure: title items that can be set for one unit document information and corresponds to retrieval keys.

Title range: a code representing the range of document information recorded in a single file cassette.

Alias: a code that represents the meaning of a number of digits with a fewer number of digits such as a contracted telephone dial.

Figure 6A:
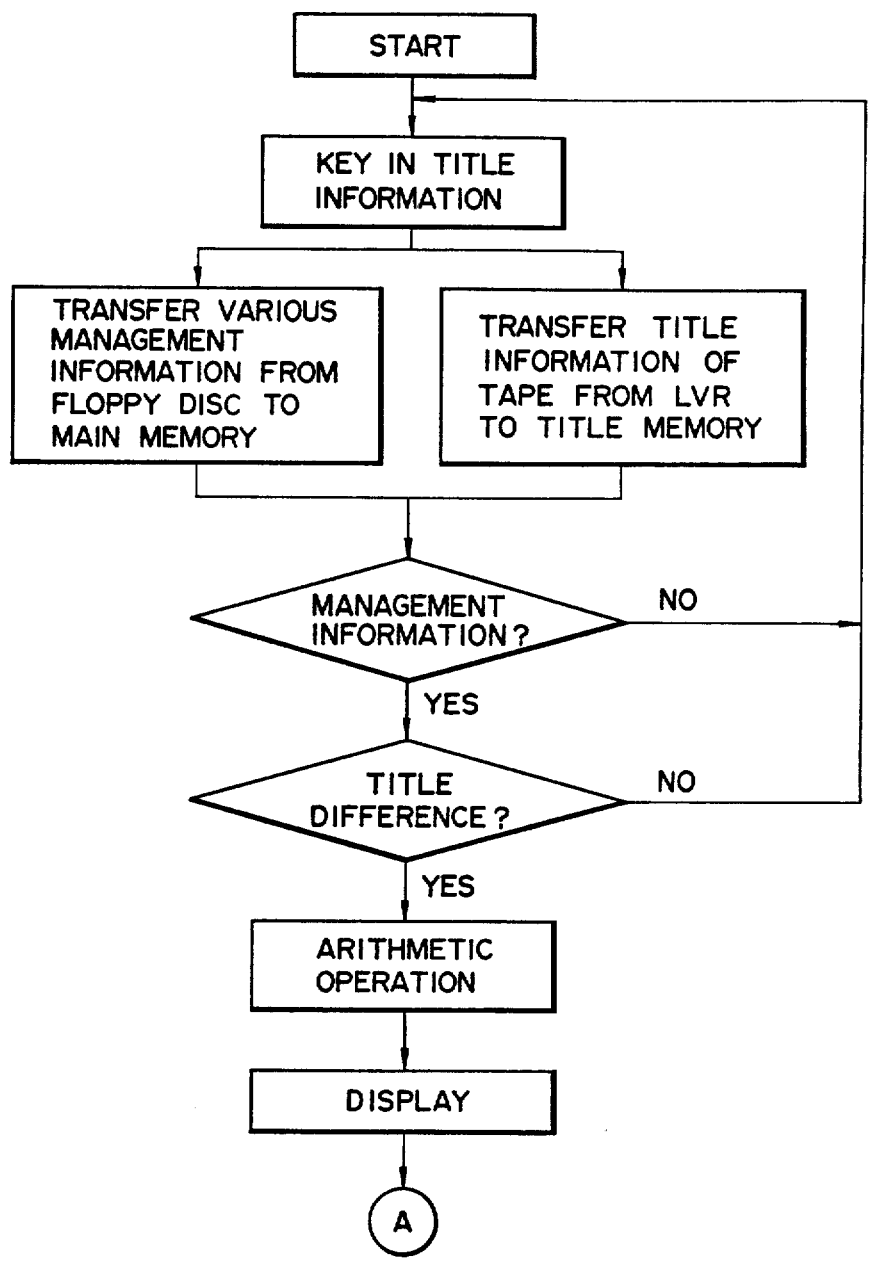
FIGS. 6A and 6B are flow charts for explaining the operation of the document information filing system shown in FIG. 2.
Figure 6B:
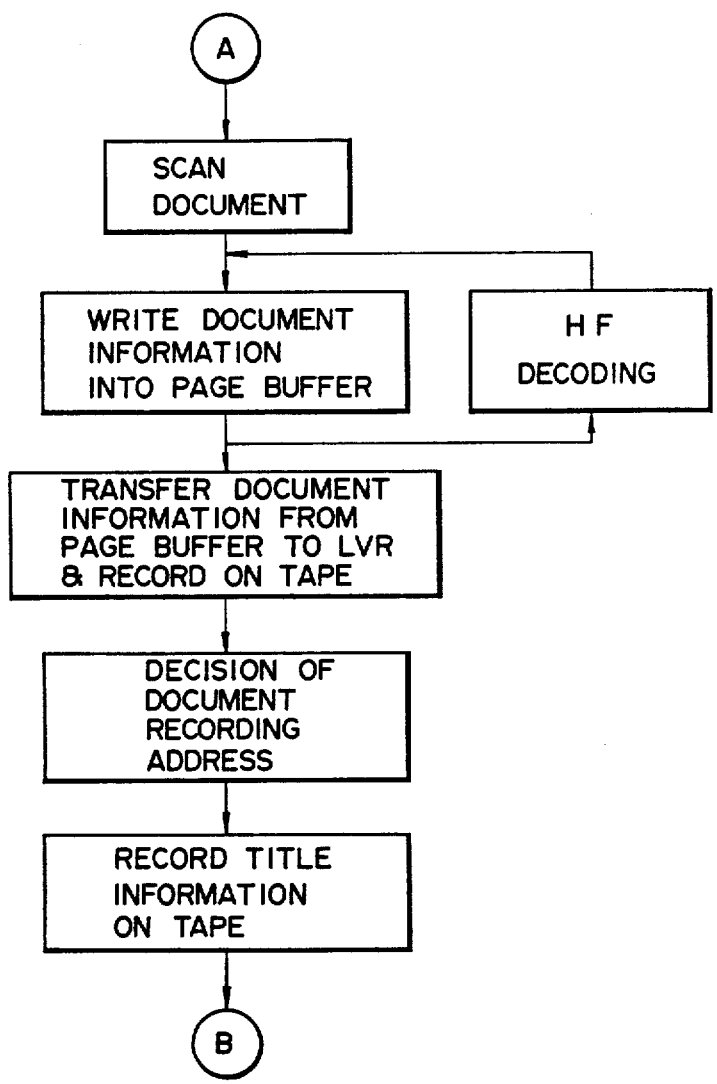

Now, the operation of the document information filing system according to the invention will be described with reference to the flow charts of FIGS. 6A and 6B. When a document set in a scanner 12 and a magnetic tape cassette 29 is loaded in the main LVR 11a, the CPU 22 gives a reproduce instruction to the LVR 11a. According to this reproduce instruction, the LVR 11a reproduces title information from the title information track (track No. 100) of the magnetic tape 29a. The reproduced title information is transferred through the image bus to the title memory 23 and written therein. At this time, various management information stored in the floppy disc in the floppy disc device 16 is transferred therefrom to the main memory 24 and stored therein. When the title and size of a document is keyed in by the keyboard 14, these data are written in the main memory 24. The CPU 22 then executes a decision as to whether the management information of the title information in the title memory 23 corresponds to the management information of the main memory 24. If this decision yields a negation, the CPU 22 decides that the document information to be recorded is not suited to the document information filing system and inhibits its recording. In this case, the operation mode is returned to the keying-in step. If the decision mentioned above is unsatisfied, the CPU 22 then executes a decision as to whether the title keyed in and stored in the main memory 24 differs from the title in title information in the title memory 23. If this decision is satisfied, the CPU 22 causes the recording of the document information. If the decision is unsatisfied, the CPU inhibits the recording of the document information. When the decision is satisfied, the CPU 22 calculates the remaining storage capacity of the magnetic tape 29a, i.e., the quantity of document information that can be recorded on the magnetic tape 29a being used. In the calculation of the remaining storage capacity, the CPU 22 calculates the total quantity of document information recorded on the tape 29a, i.e., the number U of recorded sectors from the track and sector numbers of address section of index information in the title information stored in the title memory 23. From this number U of the recorded sectors, the rated storage capacity T (256 sectors × 198 tracks) of the magnetic tape, the present non-compressed document information quantity Dmax (sector number of 91) of one unit document information and the average compressed document information quantity Dtyp (sector number of 14 for A4 size document) of one unit information recorded on the magnetic tape, the CPU 22 calculating the remaining storage capacity R (in the form of the number of A4 size documents) using an equation $$R = \frac{T - U - Dmax}{Dtyp}$$

The calculated remaining storage capacity (i.e., the number of unit document that can be recorded on the tape being used) is displayed on the display 13. If the result R of calculation includes a decimal fraction, the fraction is raised to a unit. The quantity Dmax is a value which is set by taking into considerations that the unit document information that is actually recorded on the magnetic tape 29a is liable to be greater than the quantity Dtyp. According to CCITT standards, the non-compressed document information of an A4 size document is a signal of 4 Mbits (which correspond to 91 sectors), while the compressed document information is a signal of 4 Mbits/8, i.e., 0.5 Mbits.

The operator may determine from the remaining storage capacity R displayed on the display 13 that the documents to be recorded can be reproduced. If it is determined that these document can be recorded, a record start instruction is fed from the keyboard 14 to the CPU 22. The CPU 22 then transmits a document information recording start instruction to the scanner 12 and LVR 11a. As a result, the scanner 12 scans document and generates document information corresponding to the document pattern. The document information produced from the scanner 12 is written into the page buffer 26. The document information stored into the page buffer 26 is subjected to a compression treatment in the MH coding and decoding circuit 28. The compressed document information is written again in the page buffer 26. When document information for one page is stored in the page buffer 26, it is transferred therefrom to the LVR 11a. In the LVR 11a, the compressed document information is recorded in recording tracks following the tracks where document information is already recorded on the magnetic tape 28a. When the document information for one page is completely recorded in recording tracks, the CPU 22 determines the recording position, i.e., address, of the document information recorded on the magnetic tape 28a from the track No. and sector No. of the recorded document information, and produces index information from this address and also from the keyed-in title and document size stored in the main memory 24. The index information is added to the various index information of the title information. When document information of a given number of documents has been recorded on the tape, the various index information that is renewed in the title memory 23 is recorded together with the management information in the title information recording tracks (track No. 100 and No. 101) of the magnetic tape 29a.

It is to be appreciated that since the quantity of document information that can be recorded on the magnetic tape is calculated and displayed prior to the recording of document information of the tape, the remaining document information storage capacity can be visually determined before the recording of document information to avoid such an inconvenience that the recorder gets out of recording capacity before completion of the recording.

Now, the operation that takes place when retrieving for an reading out desired document information among the document information stored in the magnetic tape will be described. In this case, the relevant magnetic tape cassette is loaded in the LVR 11a, and a "retrieval mode" is set by the keyboard. At this time, the LVR 11a reads out the title information as shown in FIG. 4 from the title information recording track (of track No. 100 or 101) of the magnetic tape 29a and transmits it to the title memory 23 for storage therein. When the title information is entirely stored in the title memory 23, the various index information of the title memory 23 is displayed on the display 13. The operator searches for the index information corresponding to a desired document among the various index information displayed. When the desired index information is found and the sequence number therein is keyed in from the keyboard 14, the index information corresponding to the sequence number is selected, and the LVR 11a is caused to read out index information from the magnetic tape according to the address of the selected index information. The read-out information for one page is stored in the page buffer 26. Thus, the document information in the page buffer 26 is read out therefrom and transferred to the MH coding and decoding circuit 28. In the MH coding and decoding circuit 28, the input compressed document information is subjected to MH-decoding to obtain the decoded document information which is transferred to the page buffer 26 for storage therein again. When the MH-decoding of document information for one page is ended so that decoded document information for one page is stored in the page buffer 26, the document information in the page buffer 26 is displayed on the display 13. The operator may confirm that the document information displayed on the display 13 is the desired document information and, if necessary, operate a print operation key for obtaining a hard copy of the displayed document information. When the document information is coupled to the copying device 15, the device 15 renderes it into visible image on a sheet by the electrophotographic method.

As has been described in the foregoing, according to the invention the quantity of document information that can be recorded on a recording medium being used can be confirmed before recording document information of the recording medium, so that it is possible to avoid the possibility of shortage of the recording capacity of the recording medium that might otherwise result during recording of a number of units of document information related to one another on a recording medium.

While in the above embodiment the remaining storage capacity has been calculated and displayed only when recording image information, it is possible to calculate and display the remaining storage capacity as the time of retrieving for and reading out document image information as well. Further, it is possible to let the calculation and display of the remaining storage capacity to be effected without fail while the magnetic tape is set. Further, while the above description has concerned with the case of using the magnetic tape as the recording medium, similar effects may of course of obtained in case of using the optical disc as well. Furthermore, while in the above embodiment the quantity of document information stored in the recording medium has been calculated from the information stored in the recording medium has been calculated from the information length L of the address code constituting the index information, if may be calculated from the track address T.ADR and sector address S.ADR of the address code as well.

What is claimed is:

1. A document information filing system comprising:

means for calculating the remaining number of documents that may be stored on a recording medium from an address of index information in title information recorded on the recording medium, rated storage capacity of the recording medium and an average document information quantity of unit document information;

means for displaying the remaining storage capacity calculated by said calculating means;

document information producing means for producing document information corresponding to a pattern of a document through scanning thereof;

means for compressing the document information of said document information producing means;

recording and reproducing means for recording compressed document information from said compressing means on the recording medium and reading out the recorded compressed document information; and means for decoding the compressed document information read out by said recording and reproducing means into the initial document information.

2. The document information filing system according to claim 1, wherein said calculating means calculates the remaining storage capacity R using a formula $$R = \frac{T - U - Dmax}{Dtyp}$$

where U is the quantity of already recorded document information, T is the rated storage capacity of the recording medium, Dtyp is the average document information quantity of unit document information, and Dmax is the non-compressed document information quantity of unit document information.

3. A document information filing system comprising:

recording and reproducing means for recording and reproducing document information and title information containing management information and index information corresponding to said document information;

a control section including a title information memory for storing title information read out from the recording medium by said recording and reproducing means and processing means for calculating the remaining number of documents that may be stored on the recording medium from the title information stored in said title information memory, the rated storage capacity of the recording medium and the average document information quantity of unit document information;

display means for displaying the remaining storage capacity calculated by said processing means of said control section and document information;

document information producing means for providing document information of the pattern of a document through the scanning thereof;

information coding and decoding means having a coding function for compressing the document information from said document information producing means to produce compressed document information and a decoding function for expanding the compressed document information;

means for coupling said compressed document information to said recording and reproducing means for recording; and a copying device connected to said information coding and decoding means, said copying device for producing a hard copy of said document information when required.

4. The document information filing system according to claim 3, wherein said processing means calculates the remaining storage capacity R using a formula $$R = \frac{T - U - Dmax}{Dtyp}$$

where U is the quantity of recorded document information, T is the rated storage capacity of the recording medium, Dtyp is the average document imformation quantity of unit document information, and Dmax is the non-compressed document information quantity of unit document information.

5. The document information filing system according to claim 3 or 4, wherein said control section includes a page buffer for temporarily storing document information for one page.

6. The document information filing system according to claim 3 or 4, wherein said coding and decoding means is a modified Hofmann coding and decoding circuit.

7. The document information filing system according to claim 3 or 4, wherein said recording and reproducing means is a video recorder.

8. The document information filing system according to claim 3 or 4, wherein said copying device is an electrophotographic copying device.

* * * * *